(12) United States Patent
Hirayama et al.

(10) Patent No.: US 11,035,101 B2
(45) Date of Patent: Jun. 15, 2021

(54) CONTROL SYSTEM FOR WORK VEHICLE, CONTROL METHOD, AND WORK VEHICLE

(71) Applicant: KOMATSU LTD., Tokyo (JP)

(72) Inventors: Masami Hirayama, Kensington (AU); Mark Whitty, Kensington (AU); Jayantha Katupitiya, Kensington (AU); Jose Guivant, Kensington (AU)

(73) Assignee: KOMATSU LTD., Tokyo (JP)

( * ) Notice: Subject to any disclaimer, the term of this patent is extended or adjusted under 35 U.S.C. 154(b) by 294 days.

(21) Appl. No.: 16/335,392

(22) PCT Filed: Jul. 7, 2017

(86) PCT No.: PCT/JP2017/025022
§ 371 (c)(1),
(2) Date: Mar. 21, 2019

(87) PCT Pub. No.: WO2019/008767
PCT Pub. Date: Jan. 10, 2019

(65) Prior Publication Data
US 2020/0018047 A1    Jan. 16, 2020

(51) Int. Cl.
*E02F 9/26* (2006.01)
*G05D 1/02* (2020.01)
(Continued)

(52) U.S. Cl.
CPC .............. *E02F 9/262* (2013.01); *B66F 9/195* (2013.01); *E02F 3/84* (2013.01); *E02F 9/2045* (2013.01);
(Continued)

(58) Field of Classification Search
CPC . E02F 9/261; E02F 9/262; E02F 9/265; E02F 9/2029; E02F 9/2045; E02F 3/76;
(Continued)

(56) References Cited

U.S. PATENT DOCUMENTS 5,462,122 A * 10/1995 Yamamoto .............. E02F 3/842
172/2
5,996,703 A * 12/1999 Yamamoto .............. E02F 3/845
172/4.5
(Continued)

FOREIGN PATENT DOCUMENTS

JP    7-26586 A    1/1995
JP    7-146707 A    6/1995
(Continued)

OTHER PUBLICATIONS

The International Search Report for the corresponding international application No. PCT/JP2017/025022, dated Sep. 5, 2017.

*Primary Examiner* — Thomas G Black
*Assistant Examiner* — Sara J Lewandroski
(74) *Attorney, Agent, or Firm* — Global IP Counselors, LLP

(57) ABSTRACT

A controller obtains dumping area data indicative the shape of an edge of a dumping area. The controller obtains material data indicative the shape of material in the dumping area. The controller decides, based on the material data, a plurality of segments into which the material is divided. The controller decides dumping positions of the dumping work according to combinations of the plurality of segments and the plurality of dumping candidate positions.

20 Claims, 11 Drawing Sheets

(51) Int. Cl.
  *E02F 3/84* (2006.01)
  *E02F 9/20* (2006.01)
  *B66F 9/19* (2006.01)
(52) U.S. Cl.
  CPC ... *G05D 1/0217* (2013.01); *G05D 2201/0202* (2013.01)
(58) Field of Classification Search
  CPC ..... E02F 3/84; E02F 5/00; E02F 5/027; E02F 5/102; E02F 5/103; E02F 5/106; B66F 9/195
  See application file for complete search history.

(56) References Cited

U.S. PATENT DOCUMENTS

| | | | | |
|---|---|---|---|---|
| 6,539,294 | B1* | 3/2003 | Kageyama | E02F 3/842 |
| | | | | 180/168 |
| 9,297,147 | B1* | 3/2016 | Wei | E02F 9/205 |
| 2007/0150133 | A1* | 6/2007 | Sudou | G05D 1/0278 |
| | | | | 701/23 |
| 2009/0327011 | A1 | 12/2009 | Petroff | |
| 2012/0310691 | A1 | 12/2012 | Carlsson et al. | |
| 2013/0238182 | A1* | 9/2013 | Osagawa | E21C 47/00 |
| | | | | 701/26 |
| 2016/0076223 | A1* | 3/2016 | Wei | E02F 9/205 |
| | | | | 701/50 |
| 2016/0342915 | A1 | 11/2016 | Humphrey | |
| 2018/0016767 | A1* | 1/2018 | Ge | E02F 9/205 |
| 2018/0245317 | A1* | 8/2018 | Ready-Campbell | E02F 3/435 |
| 2021/0063288 | A1* | 3/2021 | Mitra | G01N 1/2813 |

FOREIGN PATENT DOCUMENTS

| | | |
|---|---|---|
| JP | 2007-164279 A | 6/2007 |
| JP | 2010-211827 A | 5/2010 |
| JP | 2012-118694 A | 3/2012 |
| JP | 2014-526072 A | 10/2014 |
| JP | 2016-132912 A | 7/2016 |

* cited by examiner

CONTROL SYSTEM FOR WORK VEHICLE, CONTROL METHOD, AND WORK VEHICLE

CROSS-REFERENCE TO RELATED APPLICATIONS

This application is a U.S. National stage application of International Application No. PCT/JP2017/025022, filed on Jul. 7, 2017.

BACKGROUND

Field of the Invention

The present invention relates to a control system for a work vehicle, a control method, and a work vehicle.

Background Information

Dumping work in a dumping area is a type of work performed by a work vehicle. Dumping work involves, for example, transporting material such as soil that has been excavated at a mine up to the precipice of a dumping area and discharging the material to the bottom of the precipice. In dumping work, the material is accumulated in the dumping area and the accumulated material is pushed off from the precipice by a work vehicle such as a bulldozer, and the material falls down to the bottom of the precipice.

SUMMARY

The total amount of the material accumulated in the dumping area often exceeds the maximum capacity that can be carried by the blade of the work vehicle. In addition, there is a gap between the material accumulated in the dumping area and the edge of the precipice of the dumping area. Therefore, during the dumping work, it is necessary to repeat the work of shaving off a portion of the accumulated material with the work vehicle, causing the work vehicle to travel to the edge of the precipice, and pushing the shaved off material from the edge of the precipice.

However, because the shape of the edge of the precipice is not uniform, distances between the material and the edge differ according to the location. Therefore, the work efficiency is affected by how the work vehicle is made to travel. While an experienced operator uses experience to figure out which travel path to use for causing the work vehicle to travel, it is not easy for an inexperienced operator to perform the work efficiently.

An object of the present invention is to efficiently and easily perform dumping work with a work vehicle.

A control system according to a first aspect is a control system for a work vehicle for performing dumping work by pushing material from an edge of a dumping area, the control system including a controller. The controller is programmed to execute the following processes. A controller obtains dumping area data which indicates the shape of an edge of a dumping area. The controller obtains material data which indicates the shape of the material in the dumping area. The controller decides, based on the material data, a plurality of segments by which the material is divided. The controller decides a plurality of dumping candidate positions along the edge of the dumping area. The controller decides the dumping positions of the dumping work according to combinations of the plurality of segments and the plurality of dumping candidate positions.

A control method according to a second aspect is a control method for a work vehicle for performing dumping work by pushing material from an edge of a dumping area, the method including the following processes. A first process is obtaining dumping area data which indicates the shape of the edge of the dumping area. A second process is obtaining material data which indicates the shape of material in the dumping area. A third process is deciding, based on the material data, a plurality of segments by which the material is divided. A fourth process is deciding a plurality of dumping candidate positions along the edge of the dumping area. A fifth process is deciding combinations of the plurality of segments and the plurality of dumping candidate positions. A sixth process is controlling the work vehicle to perform the dumping work in accordance with the combinations.

In the present invention, the material in a dumping area is divided into a plurality of segments and a plurality of dumping candidate positions are decided along the edge of the precipice of the dumping area. Dumping positions are then decided according to combinations of the plurality of segments and the plurality of dumping candidate positions. Therefore, the dumping work can be performed efficiently and easily by causing the work vehicle to move in accordance with the decided dumping positions.

DETAILED DESCRIPTION OF EMBODIMENT(S)

Figure 1:
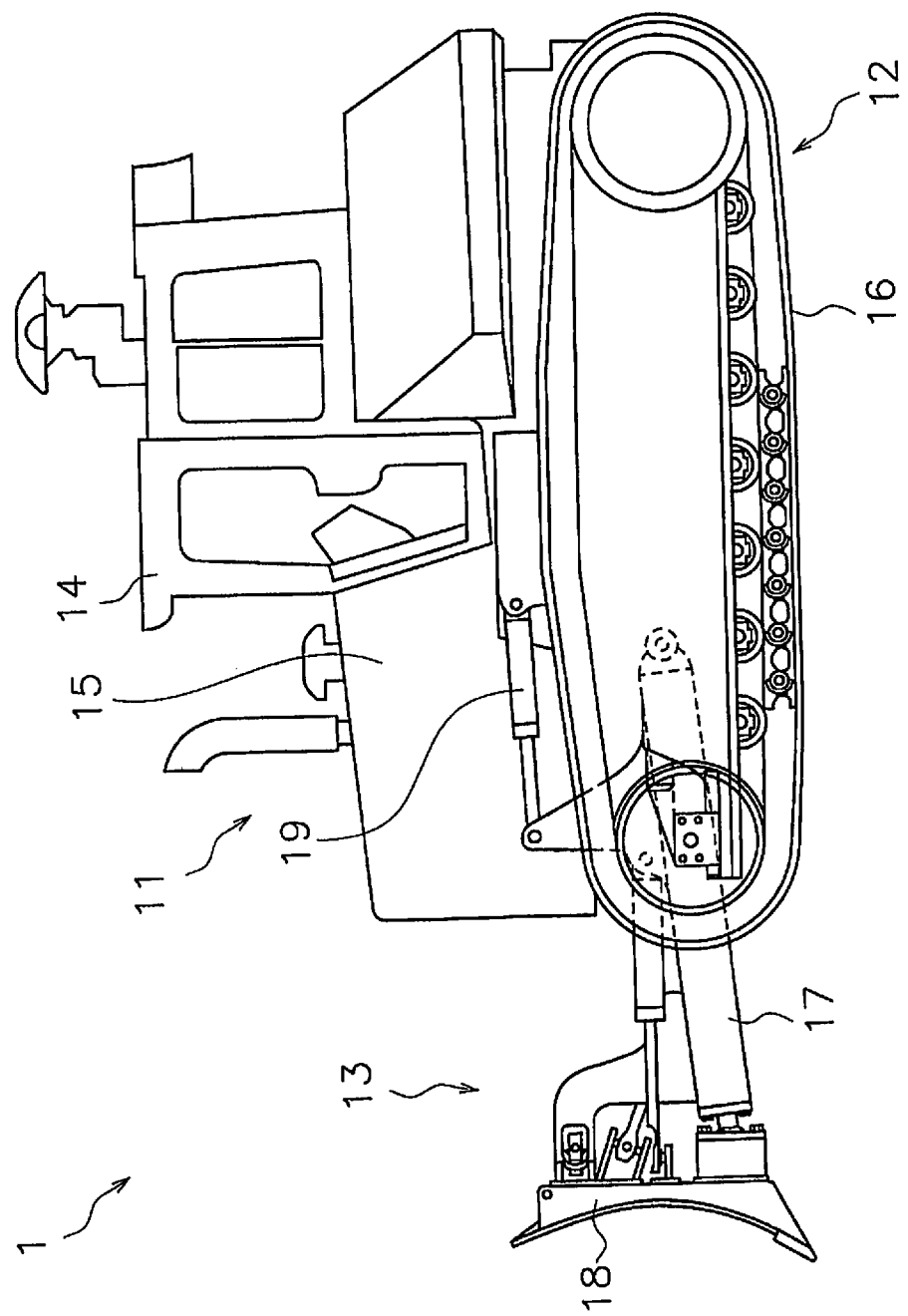
FIG. 1 is a side view of a work vehicle according to an embodiment.

A work vehicle 1 according to an embodiment shall be explained hereinbelow with reference to the drawings. FIG. 1 is a side view of the work vehicle 1 according to an embodiment. The work vehicle 1 according to the present embodiment is a bulldozer. The work vehicle 1 includes a vehicle body 11, a travel device 12, and a work implement 13.

The vehicle body 11 includes an operating cabin 14 and an engine room 15. An operator's seat that is not illustrated is disposed inside the operating cabin 14. The engine room 15 is disposed in front of the operating cabin 14. The travel device 12 is attached to a bottom part of the vehicle body 11. The travel device 12 includes a pair of left and right crawler belts 16. Only the crawler belt 16 on the left side is illustrated in FIG. 1. The work vehicle 1 travels due to the rotation of the crawler belts 16.

The work implement 13 is attached to the vehicle body 11. The work implement 13 includes a lift frame 17, a blade 18, and a lift cylinder 19. The lift frame 17 is attached to the vehicle body 11 in a manner that allows movement up and down. The lift frame 17 supports the blade 18.

The blade 18 is disposed in front of the vehicle body 11. The blade 18 moves up and down accompanying the up and down movements of the lift frame 17. The lift cylinder 19 is coupled to the vehicle body 11 and the lift frame 17. Due to the extension and contraction of the lift cylinder 19, the lift frame 17 rotates up and down.

Figure 2:
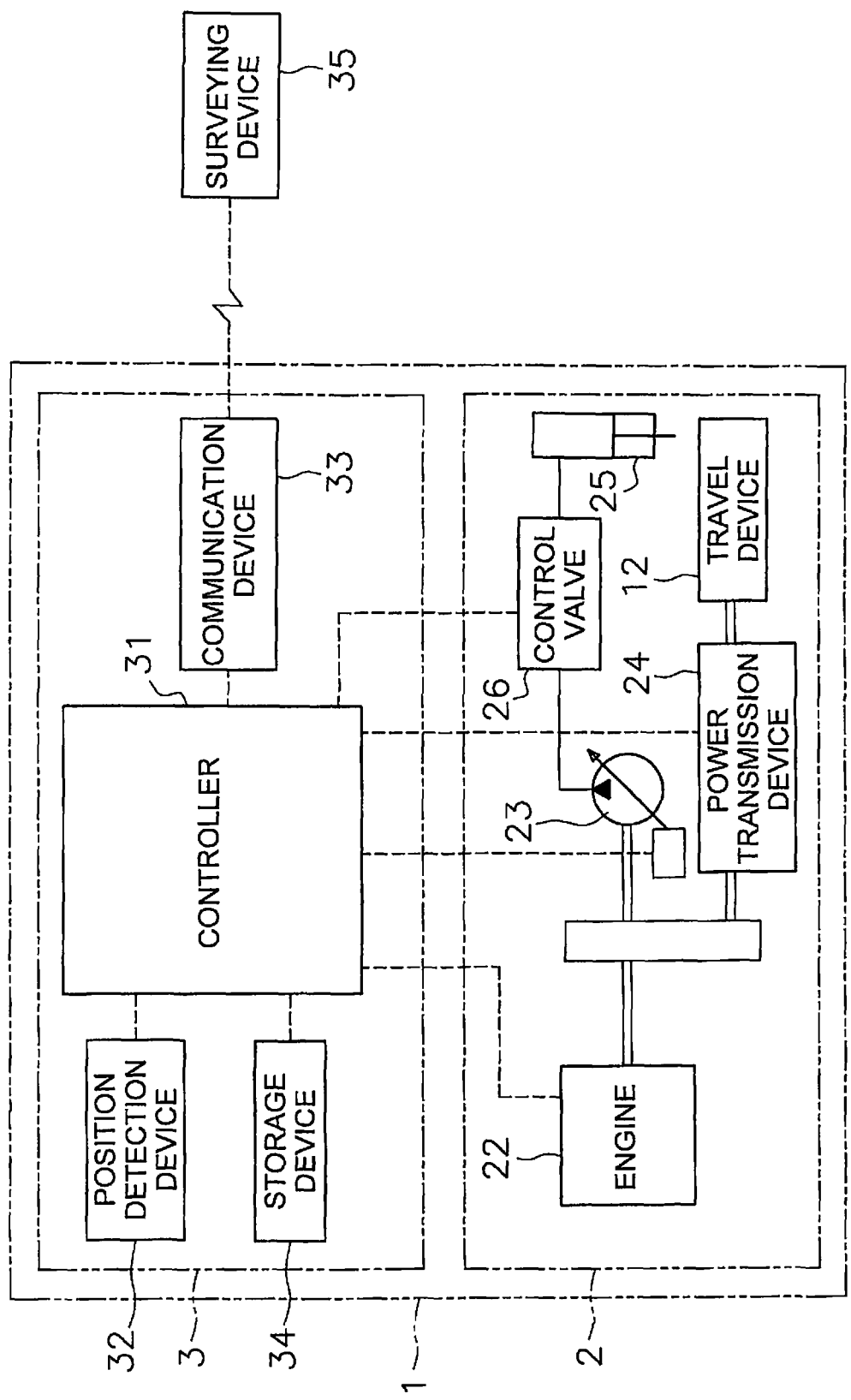
FIG. 2 is a block diagram illustrating a configuration of a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to a hydraulic actuator 25. For example, the hydraulic actuator 25 includes the abovementioned lift cylinder 19. While only one hydraulic pump 23 is illustrated in FIG. 2, a plurality of hydraulic pumps may be provided.

A control valve 26 is disposed between the hydraulic actuator 25 and the hydraulic pump 23. The control valve 26 is a proportional control valve and controls the flow rate of the hydraulic fluid supplied from the hydraulic pump 23 to the lift cylinder 19. The control valve 26 may be a pressure proportional control valve. Alternatively, the control valve 26 may be an electromagnetic proportional control valve.

The power transmission device 24 transmits driving power from the engine 22 to the travel device 12. The power transmission device 24 may be a hydrostatic transmission (HST), for example. Alternatively, the power transmission device 24, for example, may be a transmission having a torque converter or a plurality of speed change gears.

The control system 3 includes a controller 31, a position detection device 32, a communication device 33, and a storage device 34. The controller 31 is programmed so as to control the work vehicle 1 based on obtained data. The controller 31 includes, for example, a processing device such as a CPU. The controller 31 is not limited to one component and may be divided into a plurality of controllers.

The position detection device 32 detects the position of the work vehicle 1. The position detection device 32 includes, for example, a global navigation satellite system (GNSS) receiver such as a global positioning system (GPS). The controller 31 obtains current position data, which indicates the current position of the work vehicle 1, from the position detection device 32.

The communication device 33 is connected wirelessly or by wire to an apparatus outside of the work vehicle 1. The communication device 33 communicates with the apparatus outside of the work vehicle 1. For example, the communication device 33 communicates with an external surveying device 35. The surveying device 35 may be a device that uses, for example, laser surveying. Alternatively, the surveying device 35 may include a camera and may perform surveying with image data of the work site. The surveying device 35, for example, may be device mounted on an unmanned aerial vehicle (UAV) and may perform aerial surveying.

The storage device 34 includes, for example, a memory and an auxiliary storage device. The storage device 34 may be a RAM or a ROM, for example. The storage device 34 may be a semiconductor memory or a hard disk and the like. The storage device 34 is an example of a non-transitory computer-readable recording medium. The storage device 34 records computer instructions for controlling the work vehicle 1 and that are executable by the processor. In addition, the storage device 34 records data obtained from external apparatuses via the communication device 33.

The controller 31 outputs command signals to the engine 22, the hydraulic pump 23, the power transmission device 24, and the control valve 26, thereby controlling said devices. For example, the controller 31 controls the capacity of the hydraulic pump 23 and the opening degree of the control valve 26 to operate the hydraulic actuator 25. Consequently, the work implement 13 can be operated.

The controller 31 controls the rotation speed of the engine 22 and controls the power transmission device 24, thereby causing the work vehicle 1 to travel. For example, when the power transmission device 24 is an HST, the controller 31 controls the capacity of the hydraulic pump and the capacity of a hydraulic motor of the HST. When the power transmission device 24 is a transmission having a plurality of speed change gears, the controller 31 controls the actuators for gear shifting. In addition, the controller 31 controls the power transmission device 24 so as to bring about a speed difference between the left and right crawler belts 16, thereby causing the work vehicle 1 to turn.

Automatic control of the work vehicle 1 executed by the controller 31 will be explained next. The controller 31 controls the engine 22 and the power transmission device 24, thereby causing the work vehicle 1 to travel automatically. Moreover, the controller 31 controls the engine 22, the hydraulic pump 23, and the control valve 26, thereby automatically controlling the work implement 13.

Figure 3:
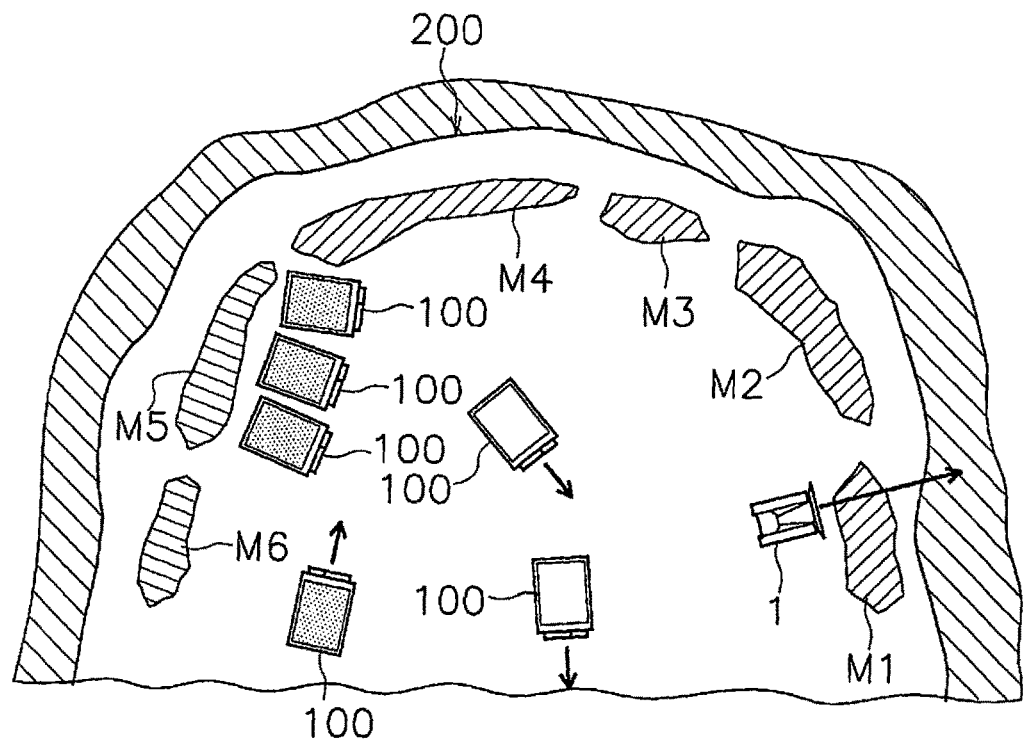
FIG. 3 is a view of a dumping area from above.
Figure 4:
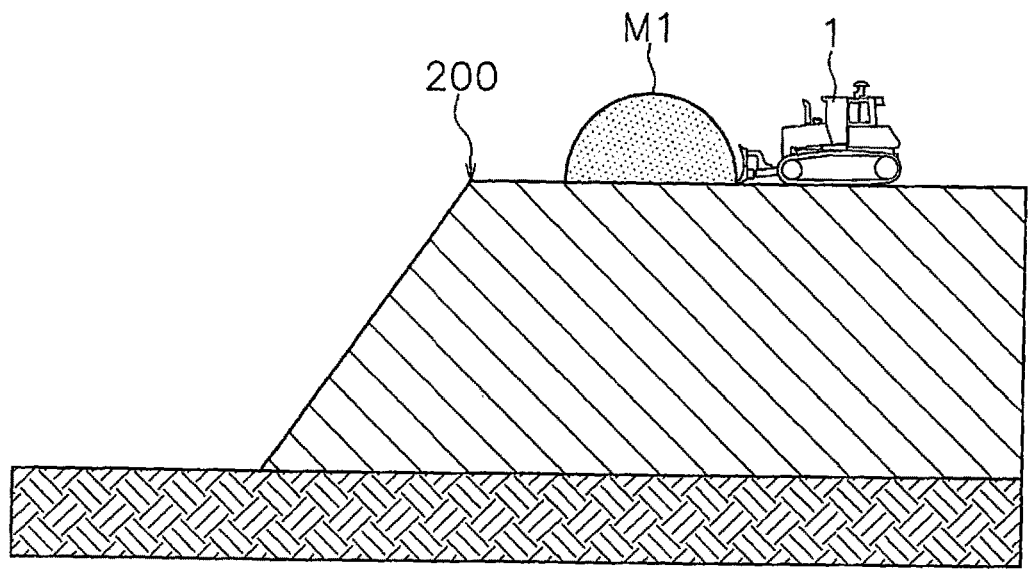
FIG. 4 is a view of the dumping area from the side.

The following is an explanation of the automatic control of the dumping work performed by the work vehicle 1. FIG. 3 is a view of a dumping area of a work site from above. FIG. 4 is a view of the dumping area from the side. As illustrated in FIG. 3, a conveying means 100 such as a dump truck conveys and discharges material such as soil in the vicinity of the edge 200 of a precipice. As a result, piles of accumulated material M1 to M6 are disposed near the edge 200 of the dumping area. The dumping work is work that involves the work vehicle 1 shaving off a portion of a pile of the material M1 to M6 with the blade 18 and pushing the material off from the edge 200 of the dumping area so that the material falls downward.

Figure 5:
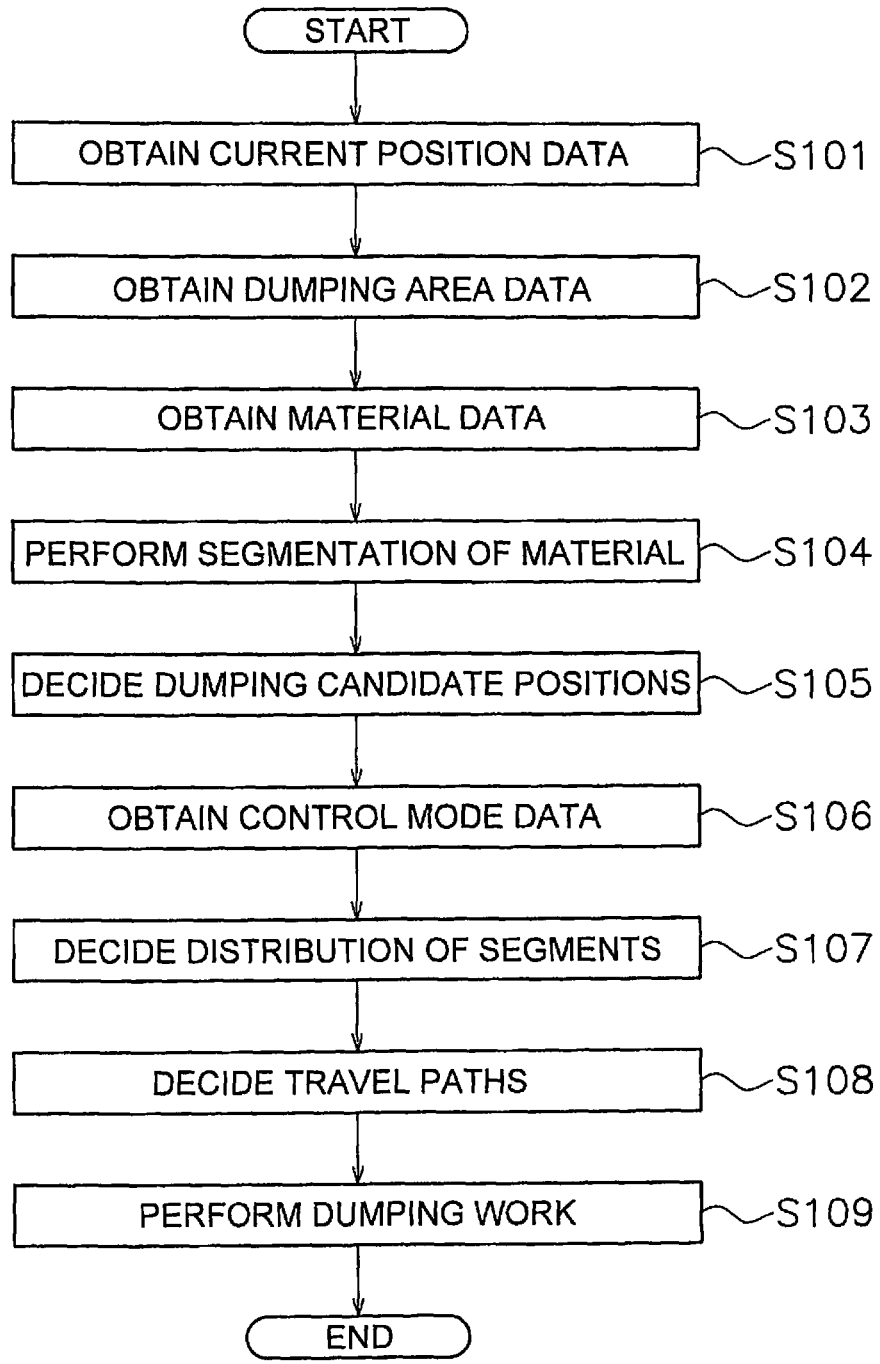
FIG. 5 is a flow chart illustrating automatic control processes of the work vehicle.

FIG. 5 is a flow chart illustrating automatic control processes of the work vehicle 1. As illustrated in FIG. 5, the controller 31 obtains current position data in step S101. The controller 31 obtains the current position data from the position detection device 32.

Figure 6:
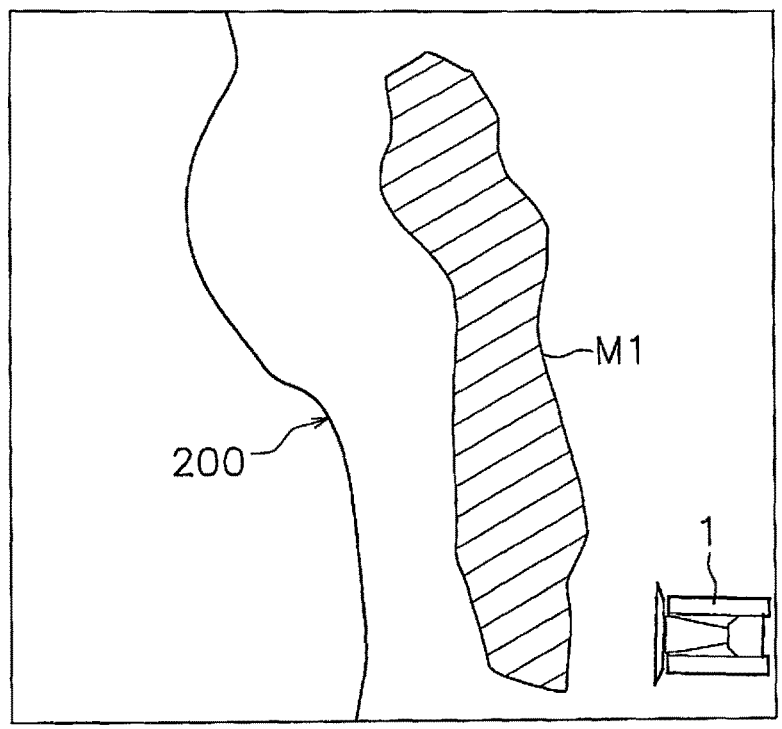
FIG. 6 is a view of examples of dumping area data and material data.

In step S102, the controller 31 obtains dumping area data. As illustrated in FIG. 6, the dumping area data includes the shape and position of the edge 200 of the dumping area. For example, the shape of the dumping area is represented by a polygon approximation. The surveying device 35 obtains dumping area data by performing a survey of the dumping area. The controller 31 obtains the dumping area data from the surveying device 35.

In step S103, the controller 31 obtains material data. As illustrated in FIG. 6, the material data depicts a three-dimensional shape and a position of the material M1 at the dumping area. For example, the shape of the material M1 is represented by a polygon approximation. The surveying device 35 obtains the material data by performing a survey of the dumping area. The controller 31 obtains the material data from the surveying device 35.

Figure 7:
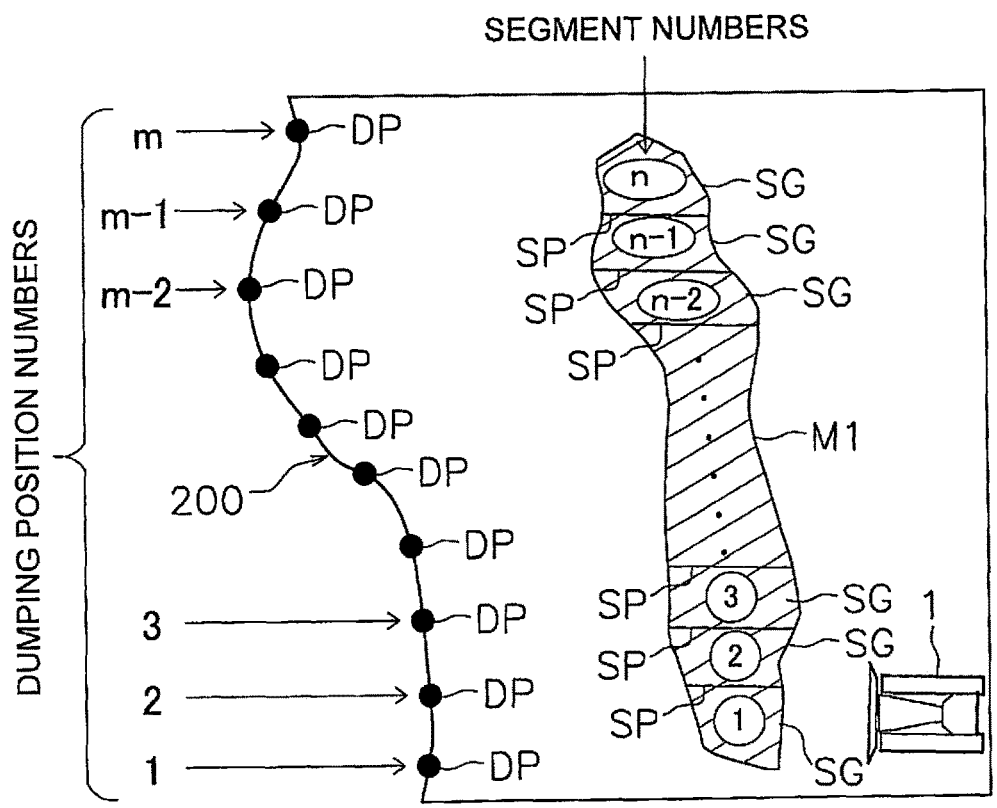
FIG. 7 illustrates an example of a plurality of segments and a plurality of dumping candidate positions.

In step S104, the controller 31 performs segmentation of the material M1. As illustrated in FIG. 7, the controller decides, based on the material data, a plurality of segments SG obtained by dividing the material M1. The controller 31 calculates the volume of the material M1 based on the material data. The controller 31 decides the position of segment surfaces SP which become the boundaries of the plurality of segments SG such that the volume of each segment SG matches a predetermined target volume. As illustrated in FIG. 7, the controller 31 thereby decides first to nth segments SG. In FIG. 7, segment numbers "1" to "n" are applied to the respective segments SG.

The segment surfaces SP, for example, follow the traveling direction of the work vehicle 1. However, the directions of the segment surfaces SP may differ from each other. The target volume may be decided based on the maximum capacity of the blade 18. For example, the target volume may be a value obtained by multiplying the maximum capacity of the blade 18 by a predetermined ratio.

In step S105, the controller 31 decides dumping candidate positions DP. The controller 31 decides a plurality of dumping candidate positions DP along the edge 200 of the dumping area. For example, the controller 31 decides positions at fixed distances along the edge 200 of the dumping area as each of the dumping candidate positions DP. Accordingly, as illustrated in FIG. 7, the controller 31 decides the first to mth dumping candidate positions DP. In FIG. 7, dumping position numbers "1" to "m" are applied to the respective dumping candidate positions DP.

The first dumping candidate position DP is positioned on the edge 200 nearest to the first segment SG. The number m of the dumping candidate positions DP may be decided based on the number n of the segments SG. The intervals between the plurality of dumping candidate positions DP may not be constant.

In step S106, the controller 31 obtains control mode data. The control mode data represents a control mode selected among a plurality of control modes. The control mode may be selected, for example, by an operator. Alternatively, the selection may be performed automatically by the controller 31. A required condition that is considered when deciding a combination of the segments SG and the dumping candidate positions DP, is set in accordance with the selected control mode. The plurality of control modes includes a shortest distance mode, an equal distribution mode, and a target distribution mode. The control modes and the required conditions are explained below.

In step S107, the controller 31 decides the distribution of the segments SG. The controller 31 decides combinations of the plurality of segments SG and a plurality of dumping candidate positions DP. The controller 31 decides the combinations of the plurality of segments SG and a plurality of dumping candidate positions DP that minimize the cost of the dumping work while satisfying the abovementioned required conditions.

In the present embodiment, the cost is the movement distance of the work vehicle 1 for carrying a segment SG to a dumping candidate position DP. In other words, the cost may be the distance between a segment SG and a dumping candidate position DP. Therefore, the controller 31 decides combinations of the plurality of segments SG and a plurality of dumping candidate positions DP with which the total movement distance is minimized. As explained below, the controller 31 uses a linear planning method to decide the combinations of the plurality of segments SG and the plurality of dumping candidate positions DP.

Figure 8:
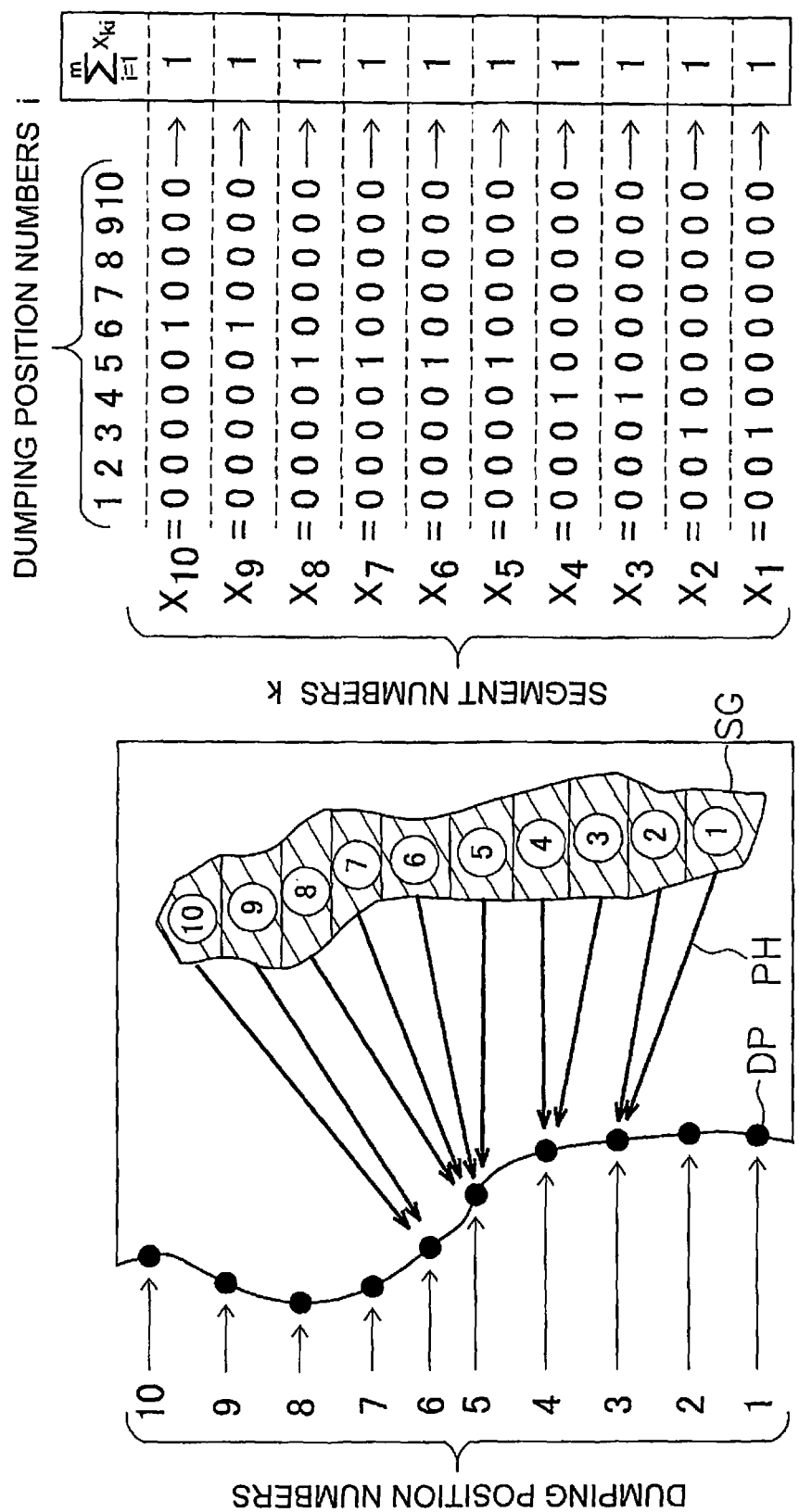
FIG. 8 illustrates an example of a solution of a variable matrix and an example of travel paths decided according to the solution.

In step S108, the controller 31 decides travel paths. The controller 31 decides the travel paths in accordance with the combinations of the plurality of segments SG and the plurality of dumping candidate positions DP decided in step S107. The controller 31 decides a dumping candidate position DP selected in a combination among the plurality of dumping candidate positions DP, as the dumping position DP. As illustrated in FIG. 8, the controller 31 then decides the travel paths PH so as to link the combined segments SG and the dumping positions DP. In FIG. 8, only a portion of the travel paths are assigned the reference numeral "PH" and the reference numerals of the other travels paths are omitted. The reference numerals "SG" of the segments and the reference numerals "DP" of the dumping positions are similarly omitted for all except portions thereof.

In step S109, the controller 31 controls the work vehicle 1 so as to perform the dumping work. The controller 31 causes the work vehicle 1 to move along the travel paths PH decided in step S108. The controller 31 controls the work vehicle 1 based on the current position data and the travel paths PH.

The process for deciding the combinations of the segments SG and the dumping candidate positions DP is explained next. In the present embodiment, integer linear programming is used to decide the combinations of the segments SG and the dumping candidate positions DR In integer linear programming, all the variables are integers. The established formula for integer linear programming is represented below by formula (1).

$$\min f(X) = C^T X \quad (1)$$

where, $$aX \le b \quad (2)$$

$$X \ge 0 \quad (3)$$

C is a cost matrix. X is a variable matrix. a and b are constant matrices which represent the required conditions of the variable matrix X. The dimensions of each of the matrices are represented below by formula (4).

$$X \in R^{(m \cdot n) \times 1}$$

$$C \in R^{(m \cdot n) \times 1}$$

$$a \in R^{p \times (m \cdot n)}$$

$$b \in R^{p \times 1} \quad (4)$$

n is the number of segments SG m is the number of dumping candidate positions DP. p is the number of required conditions. The cost matrix C is represented by the following formulas (5) and (6).

$$C = [c_1 c_2 c_3 \ldots c_n]^T \quad (5)$$

$$c_k = [c_{k1} c_{k2} c_{k3} \ldots c_{km}]^T \quad (6)$$

(k=1, 2, . . . n)

$c_{ki}$ (k=1, 2, . . . n) (i=1, 2, . . . m) represents the cost from the kth segment SG to the ith dumping candidate position DP. In the present embodiment, the movement distance from the kth segment SG to the ith dumping candidate position DP is set as the cost. The movement distance is decided, for example, by Euclidean distance. However, the movement distance may be decided by a method other than the Euclidean distance.

The variable matrix X is represented by the following formulas (7) to (9).

$$X = [x_1 x_2 x_3 \ldots x_n] \quad (7)$$

$$0 \leq X \leq 1 \quad (8)$$

$$x_k = [x_{k1} x_{k2} x_{k3} \ldots x_{km}]^T$$

$$(k = 1, 2, \ldots n) \quad (9)$$

$x_{ki}$ (k=1, 2, ... n) (i=1, 2, ... m) is a decision value of the travel path from the kth segment SG to the ith dumping candidate position DP, and is "1" or "0." "1" signifies that the travel path from the kth segment SG to the ith dumping candidate position DP is selected, and "0" signifies the travel path from the kth segment SG to the ith dumping candidate position DP is not selected. That is, the solution of the variable matrix X represents a combination of a segment SG and a dumping candidate position DP.

FIG. 8 illustrates an example of a solution of the variable matrix X and the travel paths PH decided in the case of the example solution. As illustrated in FIG. 8, $x_{13}$ equals 1. This signifies that the travel path from the first segment SG to the third dumping candidate position DP is selected. In addition, $x_{11}$ equals 0. This signifies that the travel path from the first segment SG to the first dumping candidate position DP is not selected.

FIG. 8 illustrates an example of a distribution of the segments SG in the shortest distance mode among the abovementioned control modes. In the example illustrated in FIG. 8, the number m of the dumping candidate positions DP is 10 and the number n of the segments SG is 10. In the shortest distance mode, the solution of the combinations of the segments SG and the dumping candidate positions DP is decided so as to follow a first required condition as represented by the following formula (10) and so that the total movement distance is minimized according to the objective function of the abovementioned formula (1).

$$\sum_{i=1}^{m} x_{ki} = 1 \quad (10)$$

$$(k = 1, 2, \ldots n)$$

Formula (10) signifies that the number of selected dumping candidate positions DP is one with respect to one segment SG and signifies that a plurality of dumping candidate positions DP are not selected with respect to one segment SG. For example as illustrated in FIG. 8, when $x_{23}$ is "1", the other values of $X_{2i}$ are "0" among $x_{2i}$ (i=1, 2, ... 10). This signifies that while the travel path from the second segment SG to the third dumping candidate position DP is selected, no path from the second segment SG to another dumping candidate position DP is selected. That is, the further division of each segment SG is not performed under the first required condition represented by formula (10).

In addition, the aforementioned formula (10) signifies that each of the n number of segments SG is carried to any one of the m number of dumping candidate positions DP. However, a plurality of segments SG may be selected with respect to one dumping candidate position DP.

For example, in the example in FIG. 8, the third dumping candidate position DP is selected for the first and second segments SG. The fourth dumping candidate position DP is selected for the third and fourth segments SG The fifth dumping candidate position DP is selected for the fifth to eighth segments SG. The sixth dumping candidate position DP is selected for the ninth and tenth segments SG. In this type of shortest distance mode, each of the segments SG are distributed to the closest dumping candidate position DP.

Figure 9:
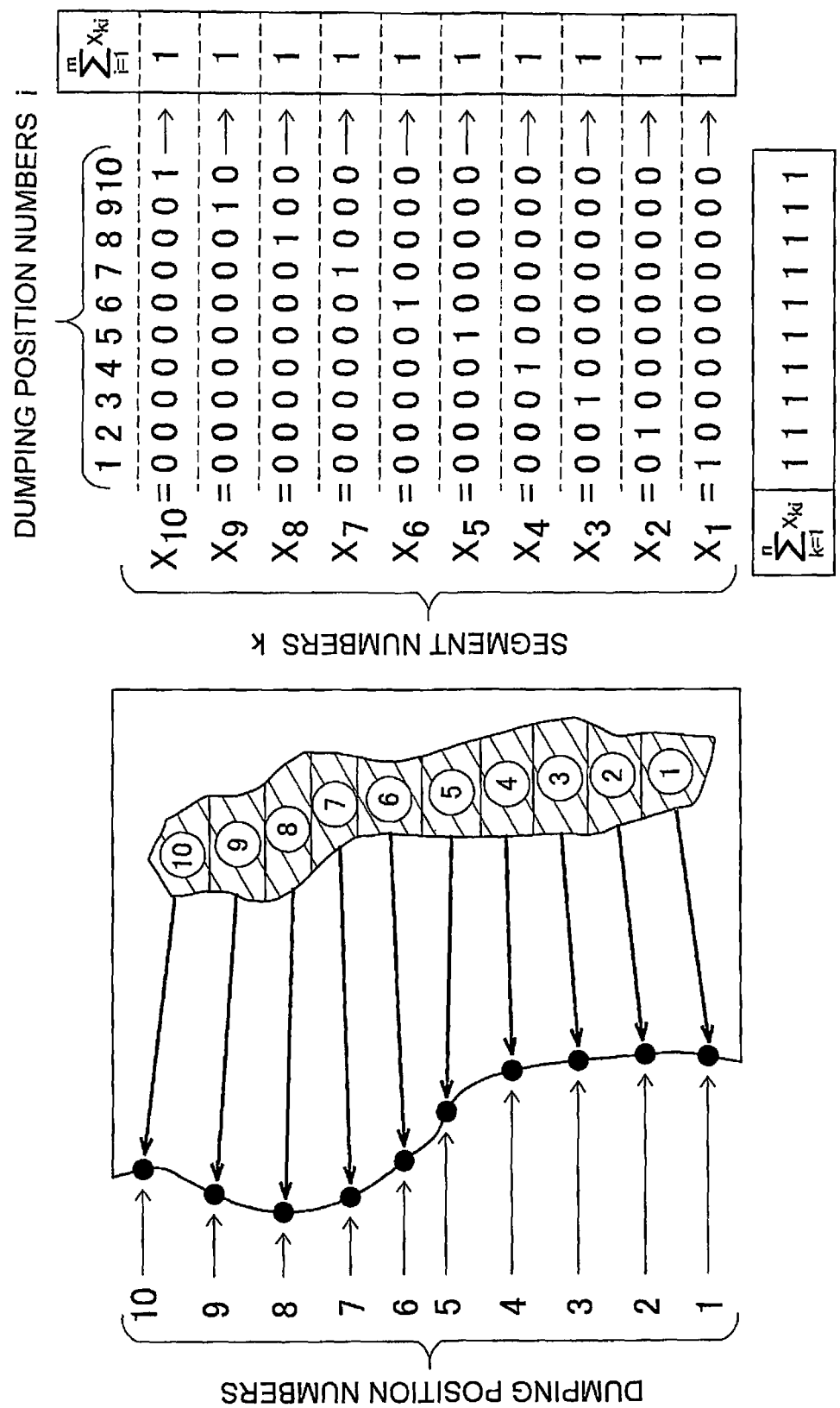
FIG. 9 illustrates an example of a solution of a variable matrix and an example of travel paths decided according to the solution.

The equal distribution mode will be explained next. FIG. 9 illustrates an example of a distribution of the segments SG according to the equal distribution mode among the abovementioned control modes. In the equal distribution mode, the solution of the combinations of the segments SG and the dumping candidate positions DP is decided so as to follow the first required condition as represented by formula (10), a second required condition as represented by the following formula (11), and so that the total movement distance is minimized.

$$\sum_{k=1}^{n} x_{ki} \leq 1 \quad (11)$$

$$(i = 1, 2, \ldots m).$$

Formula (11) signifies that the number of segments SG selected for one dumping candidate position DP is 1 or 0. For example, as illustrated in FIG. 9, when $x_{11}$ is "1" among $X_{k1}$ (k=1, 2, ... 10), all the other values of $x_{k1}$ are "0." This signifies that when a path from the first segment SG to the first dumping candidate position DP is selected, no other segment SG is selected for the first dumping candidate position DP.

According to the second required condition represented by formula (11), no more than one segment SG is selected for one dumping candidate position DP, and two or more segments SG are not selected for one dumping candidate position DR Therefore, the second required condition represented by the aforementioned formula (11) represents a required condition for distributing the segments SG equally to the dumping candidate positions DP.

For example, in the example in FIG. 9, the first to tenth dumping candidate positions DP are each selected on a one-to-one basis for the first to tenth segments SG. In this type of shortest distance mode, the segments SG are distributed to the closest dumping candidate positions DP within the condition that the segments SG are distributed equally among the dumping candidate positions DP.

In the equal distribution mode, the number m of the dumping candidate positions DP is necessarily equal to or greater than the number n of the segments SG as represented below by formula (12).

$$n \leq m \quad (12)$$

In the example illustrated in FIG. 9, because the number m of the dumping candidate positions DP and the number n of the segments SG are both ten, the ten dumping candidate positions DP are distributed equally among the ten segments SG. However, when the number m of the dumping candidate positions DP is greater than the number n of the segments SG, there may be an unselected dumping candidate position DP.

Figure 10:
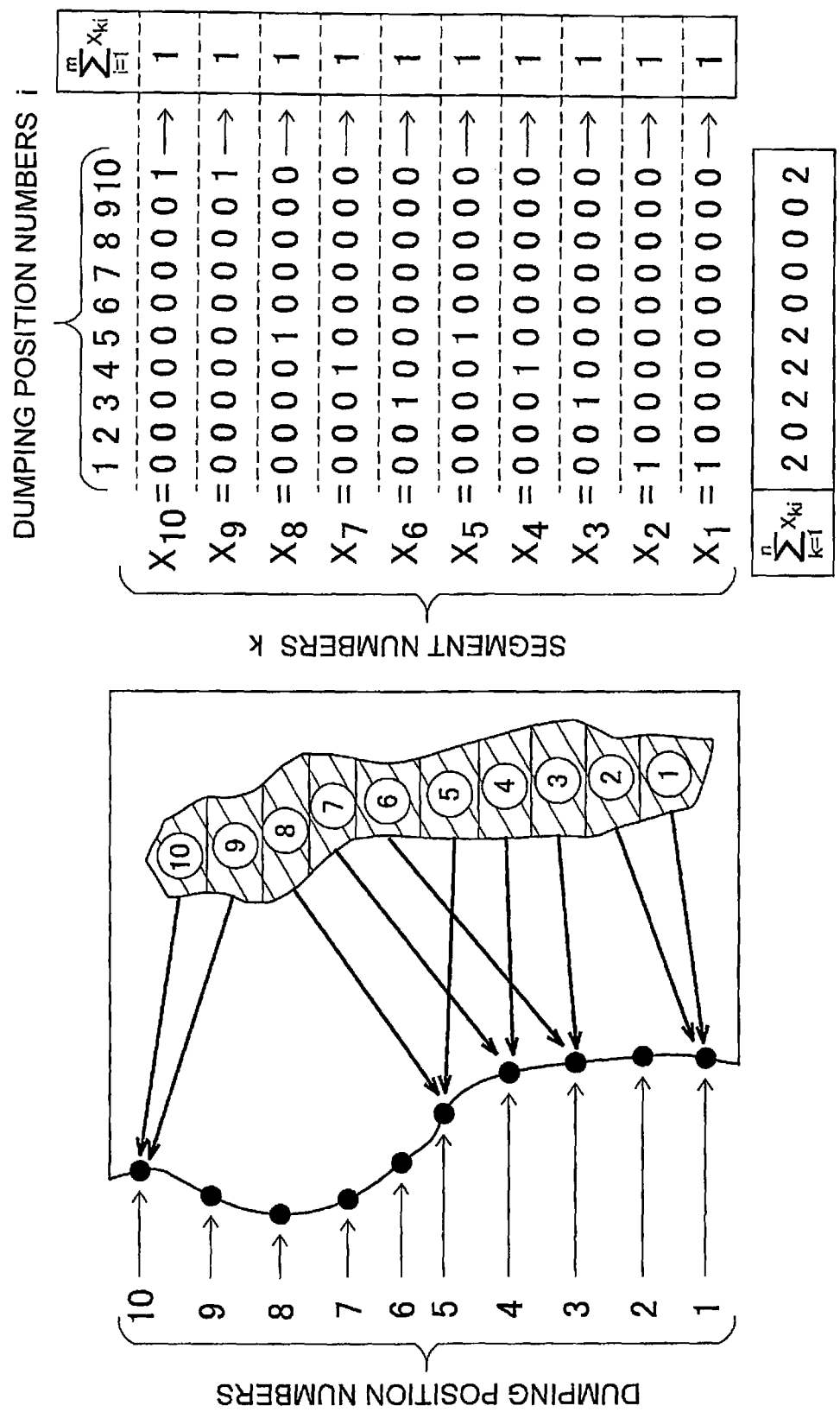
FIG. 10 illustrates an example of a solution of a variable matrix and an example of travel paths decided according to the solution.

The target distribution mode will be explained next. FIG. 10 illustrates an example of a distribution of the segments SG according to the target distribution mode among the abovementioned control modes. In the target distribution mode, the solution of the combinations of the segments SG and the dumping candidate positions DP is decided so as to follow the first required condition as represented by formula (10), a third required condition as represented by the following formula (13), and so that the total movement distance is minimized.

$$\sum_{k=1}^{n} x_{ki} = y_i \quad (13)$$

$$(i = 1, 2, \ldots m)$$

$$\sum_{i=1}^{m} y_i = V \quad (14)$$

$y_i$ is the number of segments SG distributed to the ith dumping candidate position DR V is the total amount of the material M1.

According to the third condition represented by formula (13), the number of segments SG distributed to a specific dumping candidate position DP is set. For example, $$\sum_{k=1}^{10} x_{k1} = 2$$

as illustrated in FIG. 10. This signifies that two segments SG are distributed to the first dumping candidate position DP. In addition $$\sum_{k=1}^{10} x_{k2} = 0$$

can also be found. This signifies that segments SG are not distributed to the second dumping candidate position DP.

For example, as illustrated in the example in FIG. 10, the distribution of two segments SG is set for the first, third, fourth, fifth, and tenth dumping candidate positions DP. Consequently, the first and second segments SG are selected for the first dumping candidate position DP. The third and sixth segments SG are selected for the third dumping candidate position DR The fourth and seventh segments SG are selected for the fourth dumping candidate position DP. The fifth and eighth segments SG are selected for the fifth dumping candidate position DP. The ninth and tenth segments SG are selected for the tenth dumping candidate position DP. However, segments SG are not distributed to the second, sixth, seventh, eighth, or ninth dumping candidate positions DP.

According to the target distribution mode in this way, the segments SG are distributed to the closest dumping candidate position DP within the condition that the number of segments SG to be distributed to a specific dumping candidate position DP is decided. In this way, the material M1 having an amount different from another position can be distributed to a specific dumping candidate position DP according to the third required condition represented by formula (13). Consequently, a dumping candidate position DP at which the amount of soil is relatively low compared to another location can be designated, and the segment SG can be carried to the designated dumping candidate position DP.

It should be noted that $y_i$ may be set by the operator. Alternatively, the controller 31 may decide $y_i$ based on the dumping area data.

As explained above, the material M1 in a dumping area is divided into a plurality of segments and a plurality of dumping candidate positions are decided along the edge 200 of the precipice in the dumping area according to the control system 3 of the work vehicle 1 as in the present embodiment. The travel paths PH for the work vehicle 1 are then decided according to the combinations of the plurality of segments SG and the plurality of dumping candidate positions DP. Therefore, by causing the work vehicle 1 to move along the travel paths PH, the dumping work can be performed efficiently due to the automatic control.

Although one embodiment of the present invention has been described so far, the present invention is not limited to the above embodiment and various modifications may be made within the scope of the invention.

Figure 11:
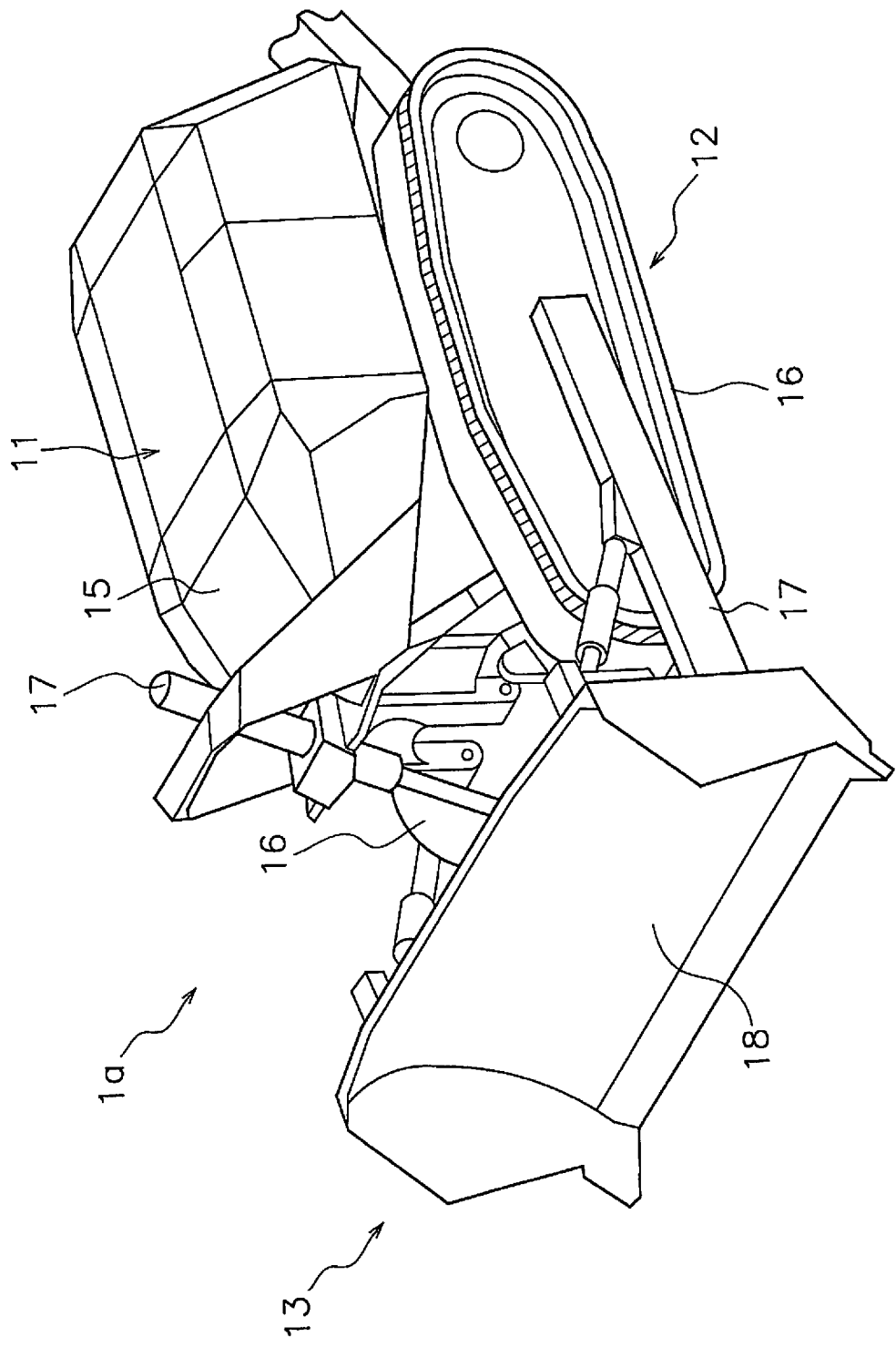
FIG. 11 is a perspective view of the work vehicle according to another embodiment.

The work vehicle 1 is not limited to a bulldozer, and may be another type of work vehicle such as a wheel loader or the like. The work vehicle 1 may be a vehicle that can be remotely operated. In this case, the operating cabin may be omitted as in a work vehicle 1a illustrated in FIG. 11. The same reference numerals are used in FIG. 11 as in the configuration corresponding to the work vehicle 1 according to the above embodiment.

Figure 12:
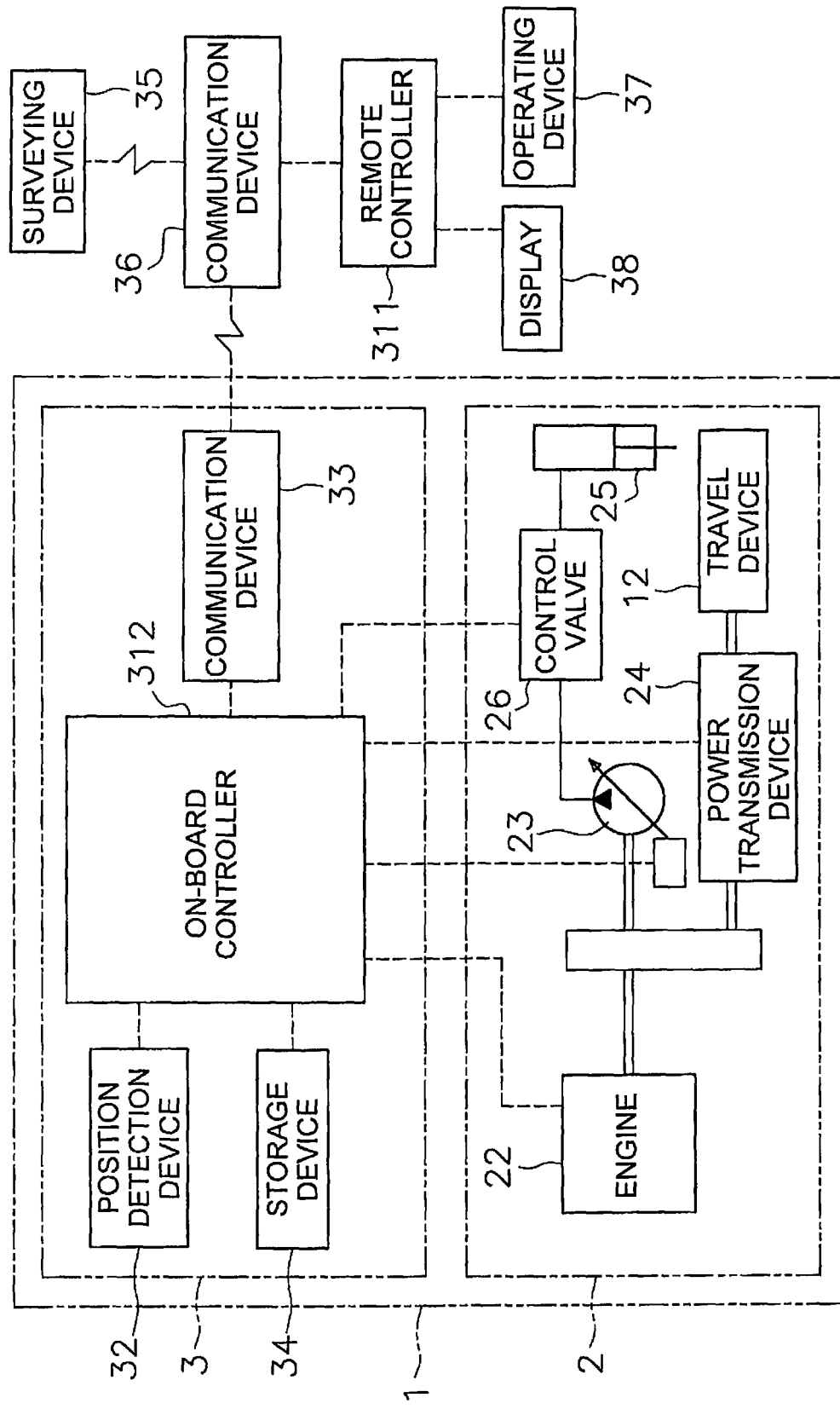
FIG. 12 is a block diagram of the control system according to another embodiment.

A portion of the control system 3 may be disposed outside of the work vehicle 1. For example, the controller 31 may have a plurality of controllers separate from each other. For example as illustrated in FIG. 12, the controller 31 may include a remote controller 311 disposed outside of the work vehicle 1 and an on-board controller 312 mounted on the work vehicle 1. The remote controller 311 and the on-board controller 312 may be able to communicate wirelessly via communication devices 33 and 36. A portion of the above-mentioned functions of the controller 31 may be executed by the remote controller 311, and the remaining functions may be executed by the on-board controller 312. For example, the process (S107) for deciding the combinations of the segments SG and the dumping candidate positions DP and the process (S108) for deciding the travel paths PH may be performed by the remote controller 311, and the process (S109) for executing the dumping work may be performed by the on-board controller 312.

The automatic control of the work vehicle 1 may be a semi-automatic control that is performed in accompaniment to manual operations by an operator. Alternatively, the automatic control may be a fully automatic control and performed without manual operations by an operator. For example as illustrated in FIG. 12, the work vehicle 1 may be operated by an operator operating an operating device 37 disposed outside of the work vehicle 1. In this case, the forward travel, the reverse travel, and turning of the work vehicle 1 may be operated with the operating device 37. Alternatively, a target point may be set with the operating device 37, and the work vehicle 1 may travel to the target point with the automatic control by the controller 31. Alternatively, the work vehicle 1 may travel with only the automatic control by the controller 31 without operations by the operating device 37.

The dumping area data and the material data may each be obtained by separate devices. For example, the dumping area data may be obtained by a surveying device outside of the work vehicle 1, and the material data may be obtained by another surveying device mounted on the work vehicle 1.

Figure 13:
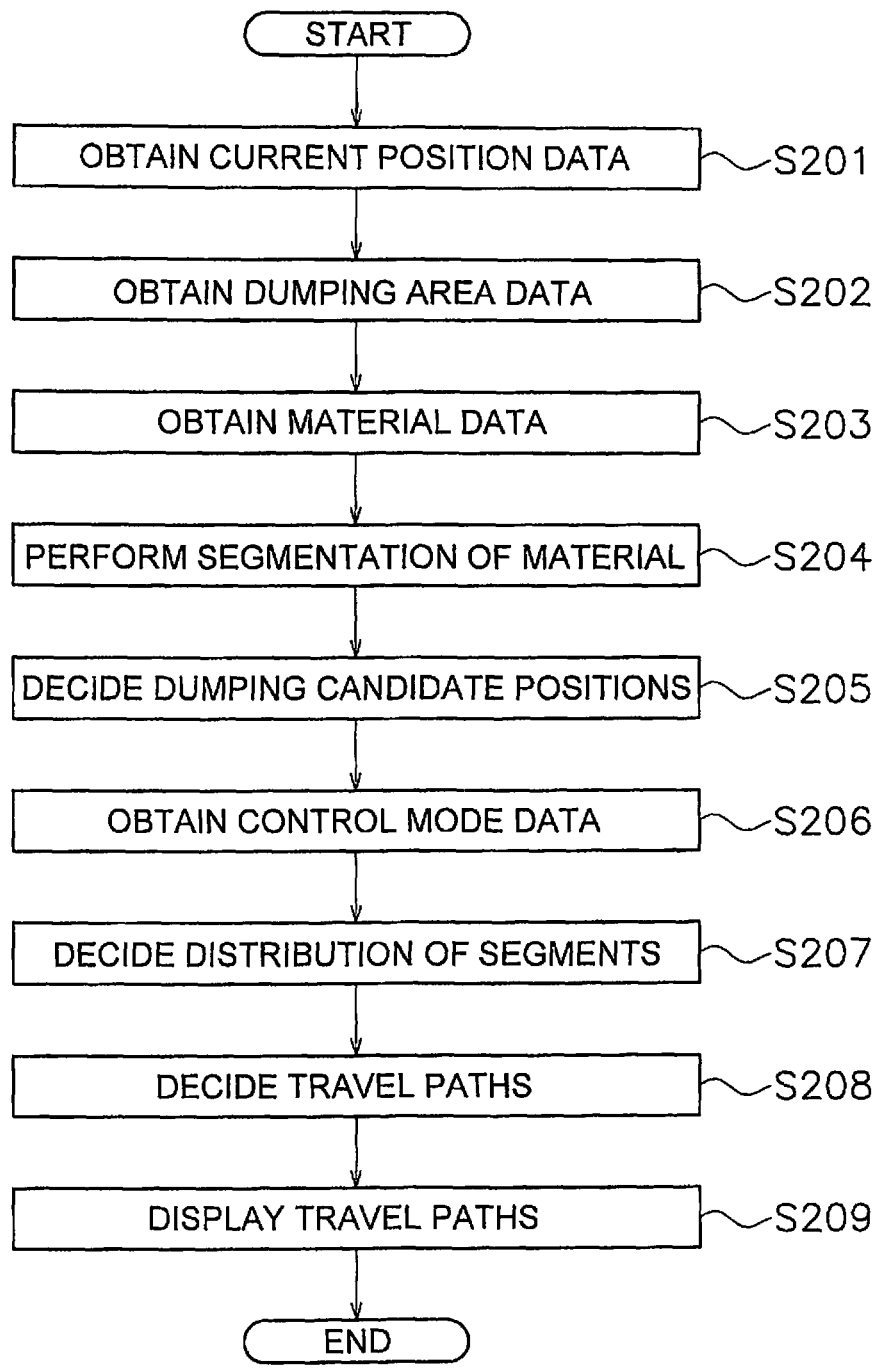
FIG. 13 is a flow chart of the automatic control processes according to another embodiment.

The dumping work may be performed with an operation by an operator. For example, as illustrated in FIG. 13, the travel paths PH may displayed in step S209. The examples of the travel paths PH as depicted in FIGS. 8 to 10 may be displayed on a display 38 illustrated in FIG. 12. In this case, the dumping work can be performed efficiently and easily by operating the work vehicle 1 following the displayed travel paths PH even if the operator has little experience. The processes of steps S201 to S208 in FIG. 13 is the same as the processes in steps S101 to S108 in FIG. 5. The operating device 37 and the display 38 may be mounted on the work vehicle 1.

The method for deciding the combinations of the segments SG and the dumping candidate positions DP with which the cost is minimized is not limited to the linear planning method, and another method may be used. The cost is not limited to the movement distance, and another parameter such as work time or the number of pushes may be used. That is, the combinations of the segments SG and the dumping candidate positions DP may be decided so as to minimize the work time or the number of pushes without being limited to the movement distance.

A portion of the required conditions in the above embodiment may be omitted or changed. Alternatively, another required condition different from the required conditions of the above embodiment may be added.

The plurality of segments SG may be decided by another method and the decision is not limited to the maximum capacity of the blade. For example, the target volume may be fixed value. Alternatively, the target volume may be a value that varies in accordance with the state of the work vehicle 1.

The travel paths PH are not limited to straight lines that link the segments SG and the dumping positions DP. For example, a travel path PH may be decided so as to minimize the amount of leakage of the material M1 from the blade.

According to the present invention, dumping work can be performed efficiently and easily with a work vehicle.

What is claimed is:

1. A control system for a work vehicle for performing dumping work by pushing material from an edge of a dumping area, the control system comprising:
a controller programmed to
obtain dumping area data indicating a shape of the edge of the dumping area,
obtain material data indicating a shape of the material in the dumping area,
decide, based on the material data, a plurality of segments into which the material is divided,
decide a plurality of dumping candidate positions along the edge of the dumping area, and
decide dumping positions of the dumping work according to combinations of the plurality of segments and the plurality of dumping candidate positions.

2. The control system for a work vehicle according to claim 1, wherein
the controller is further programmed to decide travel paths of the work vehicle in the dumping work according to the combinations.

3. The control system for a work vehicle according to claim 1, wherein
the controller is further programmed to decide the combinations of the plurality of segments and the plurality of dumping candidate positions with which a cost of the dumping work is minimized.

4. The control system for a work vehicle according to claim 3, wherein
the cost is a movement distance of the work vehicle, and
the controller is further programmed to decide the combinations of the plurality of segments and the plurality of dumping candidate positions with which a total movement distance of the work vehicle is minimized.

5. The control system for a work vehicle according to claim 3, wherein
the controller is further programmed to decide the combinations of the plurality of segments and the plurality of dumping candidate positions with which the cost is minimized according to a linear planning method.

6. The control system for a work vehicle according to claim 3, wherein
the controller is further programmed to
set a predetermined required condition for the combinations of the plurality of segments and the plurality of dumping candidate positions, and
decide the combinations of the plurality of segments and the plurality of dumping candidate positions with which the cost is minimized while satisfying the predetermined required condition.

7. The control system for a work vehicle according to claim 6, wherein
the required condition includes a number of the selected dumping candidate positions being one with respect to each of the segments.

8. The control system for a work vehicle according to claim 6, wherein
the required condition includes a number of the selected segments being one or zero with respect to each of the dumping candidate positions.

9. The control system for a work vehicle according to claim 6, wherein
the required condition includes a selection of two or more of the segments with respect to a specific dumping candidate position of the plurality of dumping candidate positions.

10. The control system for a work vehicle according to claim 1, wherein
the work vehicle includes a blade, and
the controller is further programmed to decide the plurality of segments based on a maximum capacity of the blade.

11. A work vehicle including the control system according to claim 1.

12. A control method for a work vehicle in order to perform dumping work by pushing material from an edge of a dumping area, the control method comprising:
obtaining dumping area data indicating a shape of the edge of the dumping area;
obtaining material data indicating a shape of the material in the dumping area;
deciding, based on the material data, a plurality of segments into which the material is divided;
deciding a plurality of dumping candidate positions along the edge of the dumping area;
deciding combinations of the plurality of segments and the plurality of dumping candidate positions; and
controlling the work vehicle so as to perform the dumping work according to the combinations.

13. The control method for a work vehicle according to claim 12, wherein
the combinations of the plurality of segments and the plurality of dumping candidate positions are decided so that a cost of the dumping work is minimized.

14. The control method for a work vehicle according to claim 13, wherein
- the cost is a movement distance of the work vehicle, and
- the combinations of the plurality of segments and the plurality of dumping candidate positions are decided so that a total of movement distance of the work vehicle is minimized.

15. The control method for a work vehicle according to claim 13, wherein
- the combinations of the plurality of segments and the plurality of dumping candidate positions are decided so that the cost is minimized according to a linear planning method.

16. The control method for a work vehicle according to claim 13, further comprising:
- setting a predetermined required condition for the combinations of the plurality of segments and the plurality of dumping candidate positions,
- the combinations of the plurality of segments and the plurality of dumping candidate positions being decided so that the cost is minimized while the predetermined required condition is satisfied.

17. The control method for a work vehicle according to claim 16, wherein
- the required condition includes a number of the selected dumping candidate positions being one with respect to each of the segments.

18. The control method for a work vehicle according to claim 16, wherein
- the required condition includes a number of the selected segments being one or zero with respect to each of the dumping candidate positions.

19. The control method for a work vehicle according to claim 16, wherein
- the required condition includes a selection of two or more of the segments with respect to a specific dumping candidate position of the plurality of dumping candidate positions.

20. The control method for a work vehicle according to claim 12, wherein
- the work vehicle includes a blade, and
- the plurality of segments are decided based on a maximum capacity of the blade.

* * * * *